United States Patent Office 3,322,280
Patented May 30, 1967

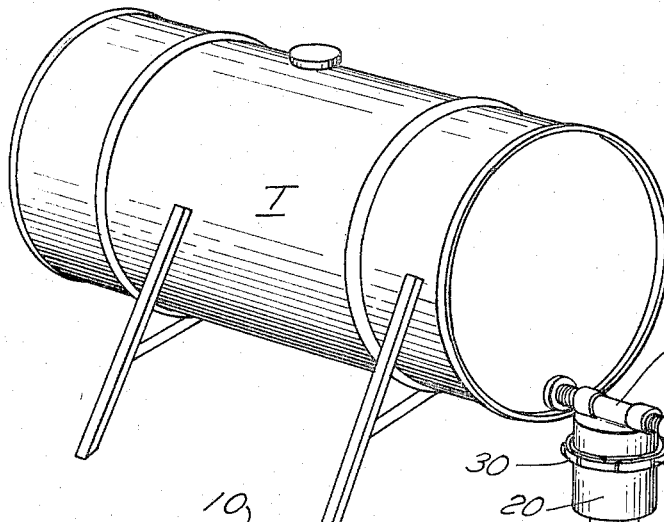
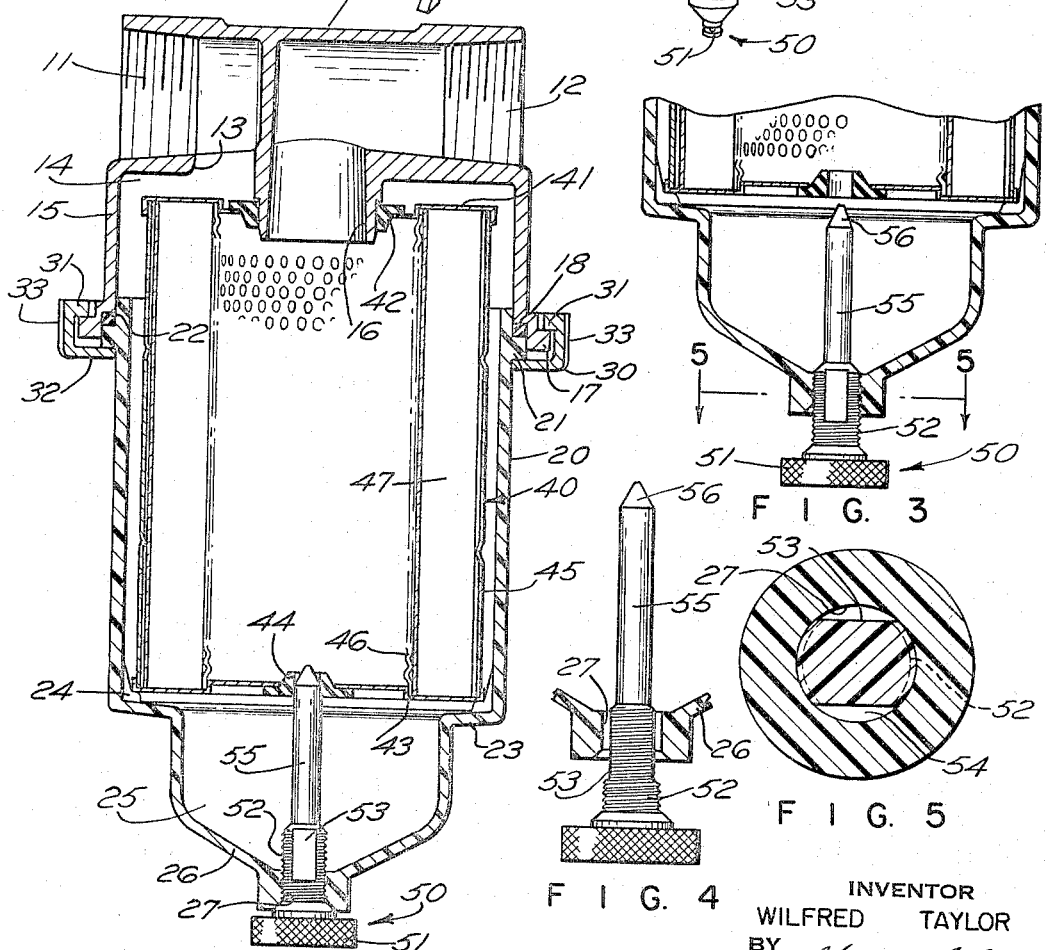

3,322,280
LIQUID FUEL FILTER AND WATER SEPARATOR
Wilfred Taylor, Stratford, Ontario, Canada, assignor to Fram Corporation, Providence, R.I., a corporation of Rhode Island
Filed June 18, 1964, Ser. No. 376,192
1 Claim. (Cl. 210—94)

This invention relates to a filter and water separator for liquids such as gasoline and other hydrocarbon fuels. The particular design used as an example in this application is intended for filtering and delivery of fuel in relatively exposed locations such as on farms, on construction sites, or outdoors where dirt and water are liable to enter the storage vessels holding such fuel. Obviously, the invention is not limited to filter-separators for liquid fuels alone or to such devices when used only in exposed locations.

One object of the invention is to provide a filter and water separator for use between a fuel storage vessel and a spigot, for filtering fuels and separating water from the fuel as it is drawn off from the storage vessel.

Another object is to provide a filter-separator of this character that is relatively inexpensive to manufacture, rugged in construction, and dependable in action over long periods of use.

A further object is to provide such a filter-separator with a cartridge unit that is easily removable and replaceable, so that when a cartridge has become loaded with dirt to a point where it no longer functions effectively, another cartridge may be substituted readily.

A particular object of this invention is to provide, in a filter-separator of the kind discussed, a means for drawing off water that has been separated from fuel passing through the device, this means acting to draw off water collected both inside and outside of the filter-separator cartridge.

Other objects, advantages and details of that which is believed to be novel and included in this invention will be clear from the following description and claim, taken with the accompanying drawing in which is illustrated one example of fuel filters and water separators embodying the present invention and incorporating the means for draining water collected both inside and outside the cartridge.

In the drawing:

FIG. 1 is a perspective view showing a liquid fuel storage tank with an exemplary filter-separator and a spigot connected thereto for drawing fuel from the tank;

FIG. 2 is a vertical sectional view on a larger scale of the fuel filter and water separator of FIG. 1, showing the parts as they would appear during flow of fuel therethrough;

FIG. 3 is a similar vertical sectional view of the bottom of the filter-separator with the water-draining element in a different position, as it would appear when water is being drained from the filter;

FIG. 4 is a vertical sectional view of the water-draining element in the position of FIG. 3, but taken at right angles to that figure, and FIG. 5 is a greatly enlarged horizontal sectional view taken on the line and direction of the arrows 5—5 of FIG. 3.

In carrying out the object of this invention, in one embodiment thereof, a filter and water separator preferably comprises but five principal parts, a main supporting body or headpiece 10, a depending enclosure or bowl 20, a locking ring 30 removably holding the bowl to the body, a filtering and water-separating cartridge 40 supported within the bowl, and a water-draining element shown here as a drain plug 50 threadedly received in a drain opening in the bottom of the bowl.

As can be seen, the body 10 supports all the other parts of the filter, either directly or indirectly, and is in turn provided with an inlet 11 connected with and supported by a storage tank T for gasoline or other liquid fuel to be filtered. A control faucet or spigot S is connected to the outlet 12 of the body or ahead of inlet 11 to start and stop flow of fuel from the tank through the filter. Suitable details, such as the threaded connections shown at the inlet and outlet are provided to secure these passages properly to the tank and to the spigot or to lengths of pipe leading thereto.

The body 10, preferably an aluminum die casting, has an opening 13 leading from the inlet passage 11 into a space 14 above the cartridge 40, within a peripheral skirt-like portion 15 on the body. The outlet 12 has a collar 16 at its inner end positioned centrally of the peripheral skirt portion and also extending downwardly, entirely within the skirt.

At the bottom edge of the skirt on the body a pair of opposite outwardly projecting locking ribs or ramps 17 are arranged, each extending circumferentially through a distance slightly less than a quadrant or 90°. These ramps slope slightly in an axial direction and will cooperate with similar and matching quadrant locking ribs 31 projecting inwardly from the locking ring 30, to hold the bowl in place as later described.

The ring 30, which also may be of aluminum, has an inwardly projecting annular flange 32 at its bottom edge, with an inside diameter great enough to clear the main cylindrical portion of the bowl 20 but small enough to engage under an outwardly projecting annular shoulder 21 on the bowl near its top edge. This shoulder serves not only as a bearing for the locking ring flange but may also support on its top edge an O-ring 22 made of a rubber-like material not affected by the fuel or other liquids that may come into contact with it. When the bowl is drawn upwardly against the body by twisting of the locking ring clockwise so that the sloping opposite ramps 31 ride over the cooperating ramps 17, the O-ring 22 engages within an annular stepped portion 18 on the skirt of the body to provide a liquid-tight seal between body and bowl.

To release the bowl, the ring 30 is twisted in the opposite direction, disengaging the quadrants on ring and body and allowing the bottom flange on the ring to fall away from the shoulder 21 on the body. Ribs 33 or knurling may be provided on the outside of locking ring 30 to assist in its manipulation by hand or by tools. The locking ring and its construction and operation is similar to that of a quarter-turn locking ring used for holding the closure of a pressure vessel and the like. Therefore it need not be further described here.

The enclosure or bowl 20 removably holds both the two remaining parts of the filter, cartridge 40 and drain plug 50. To position the cartridge properly against and around the outlet collar 16, the bowl has an inwardly stepped annular portion 23 with spaced centering legs 24 to engage against and center the bottom of the cartridge. The annular inwardly stepped portion 23 of the bowl extends to a water-collection sump 25 with a tapered or funnel-like bottom 26, at the center of which is a threaded drain opening 27. The entire bowl, or at least the collection sump and funneled bottom, is made transparent so that the level of collected water in the filter may be easily seen. If the entire bowl is made transparent, the condition of the filter also may be inspected without removing the bowl. One way to obtain the necessary transparency is to make the entire bowl of transparent nylon or similar material that is not readily attacked by the fuel or other liquids in the filter.

The cartridge 40 may be of any suitable construction for the filtering and water separating purposes intended.

Many types of filtering media and mechanical constructions suitable for this purpose are known. In the example here shown, the cartridge has a top end cap 41 with a large central grommet 42 designed frictionally to engage and seal around the central outlet collar 16 on the body when the device is assembled. A bottom end cap 43 has a smaller central grommet 44 therein for a purpose later to be described. The grommets are made of a rubber-like material similar to that of the O-ring 22. Between the end caps extend an outer cylindrical shell 45 of perforated sheet metal and an inner center tube 46 also of perforated sheet stock. Filling the space between the outer shell and the center tube and extending from end to end of the cartridge is the filtering medium 47, indicated here as a pleated filter paper of known character, preferably treated with a resin. Layers of glass fibers or other materials may be substituted for or added to the pleated filter paper here shown, depending upon the type of filtration desired and the degree of water separation needed for any particular installation. It is enough to note that in the exemplary arrangement, fuel passes from the bowl outside of the cartridge, inwardly through the cartridge, to the center tube, and is discharged through the outlet, being filtered in the process. The outside of the cartridge separates most of the water out of fuel passing through, and this water runs downwardly by gravity dropping into the sump where it is collected. However, some water may also pass to the cartridge and into the center tube, where it collects at the bottom.

To draw off water collected in the sump, without taking the entire filter apart, the removable drain plug 50 is provided, preferably threadedly received in the drain opening 27 of the bowl. In a preferred device made according to the present invention, this drain plug is made of nylon.

The outer end of the drain plug is preferably enlarged and provided with knurling as at 51 and immediately above the enlarged knurled end a threaded section 52 is provided for cooperation within the threaded drain opening 27 in the bottom of the bowl. Somewhat above the end of the threading, opposed flat faces are cut through the threads as shown at 53, to provide drain openings 54 on either side of the drain plug even when the plug is only partially removed. Above the threaded section 52 there extends an elongated cartridge-plugging pin 55 of such a length that it fits within and seals a central opening in the bottom grommet 44 of the cartridge when the device is completely assembled and the drain plug is fully seated. This is the condition of the plug shown in FIG. 2.

When inspection of the filter from outside shows that considerable water has collected in the sump at the bottom of the bowl, the drain plug 50 may be loosened until the flat areas 53 emerge from the bottom of the threaded central opening in the bowl. The water, being heavier than the liquid fuel from which it has separated, runs out through the drain passages 54 to clear the water from the sump. At the same time, the cartridge-plugging pin 55 has retreated from the opening in the grommet 44 of the cartridge so that any collected water standing within the center tube of the cartridge may also run off, being assisted or guided in its action by a pointed tip 56 on the plugging pin, this pointed pin helping to break the surface tension of any water droplets and allow them to slide down the pin to the drain passages in the drain opening. After the drain plug has been left open long enough to insure that most if not all of the collected water has drained off from the inside and outside of the cartridge, the plug is screwed home again, closing the drain opening in the bottom grommet of the cartridge and also closing the drain opening in the bottom of the transparent bowl.

Because the transparent nature of the bowl permits constant inspection of the filter for water content, and because the water may be drained off from both the inside and outside of the cartridge from time to time, as needed, a filter according to this invention may be continued in use for relatively long periods of time before it is necessary to remove the filter cartridge and replace it with a new one. Furthermore, the transparent bowl allows easy inspection of the outer surface of the filter itself so that it may be replaced only when inspection seems to warrant it, but without the necessity of taking the whole filter apart. Removal of the bowl and changing of the filter does not interfere in any way with the connection to the storage tanks or the connection to the spigot or other control member, these being secured only to the head or body 10, which remains fixed and is not disturbed.

Having thus described one embodiment of this invention, it is obvious that other modifications, variations and adaptations could be made without departing from the true spirit and scope of this invention. It is therefore intended that the appended claim shall cover such modifications, variations and adaptations as do not depart from the intent of the claim.

What I claim is:

A filter and water separator for liquid fuels comprising a supporting body having an inlet and outlet thereto, a bowl removably seated and sealed against and depending from said body, said bowl providing a main vertical internal surface and having at its bottom a water collection portion, said portion having an opening through a lower wall thereof, a filter and water separating cartridge removably carried within said bowl with its outer wall spaced from said main surface to provide a vertical flow space, said flow space communicating with said inlet and with said water collection portion, the inner wall of said cartridge communicating with said outlet, said cartridge having an opening at its bottom through which said inner wall communicates with said water collection portion, and a plug movably disposed in said bowl and having first and second portions for respectively closing said openings in said cartridge and bowl, said plug having a first position in which said openings are completely closed, and at least a second position in which said openings are open, said plug in said second position having said first portion adjacent said opening in said cartridge and said second portion partially closing said opening in said bowl, said plug having a path of continuous movement in said bowl between its said position.

References Cited
UNITED STATES PATENTS

| | | | |
|---|---|---|---|
| 2,657,808 | 11/1953 | Mankin | 210—315 |
| 2,693,281 | 11/1954 | Winzen | 210—313 X |
| 3,228,527 | 1/1966 | McPherson | 210—315 X |
| 3,237,769 | 3/1966 | Humbert | 210—94 |

SAMIH N. ZAHARNA, *Primary Examiner.*